May 30, 1933.  C. S. PHILLIPS  1,912,304
TAP FOR FLUIDS
Filed April 19, 1930    6 Sheets-Sheet 1
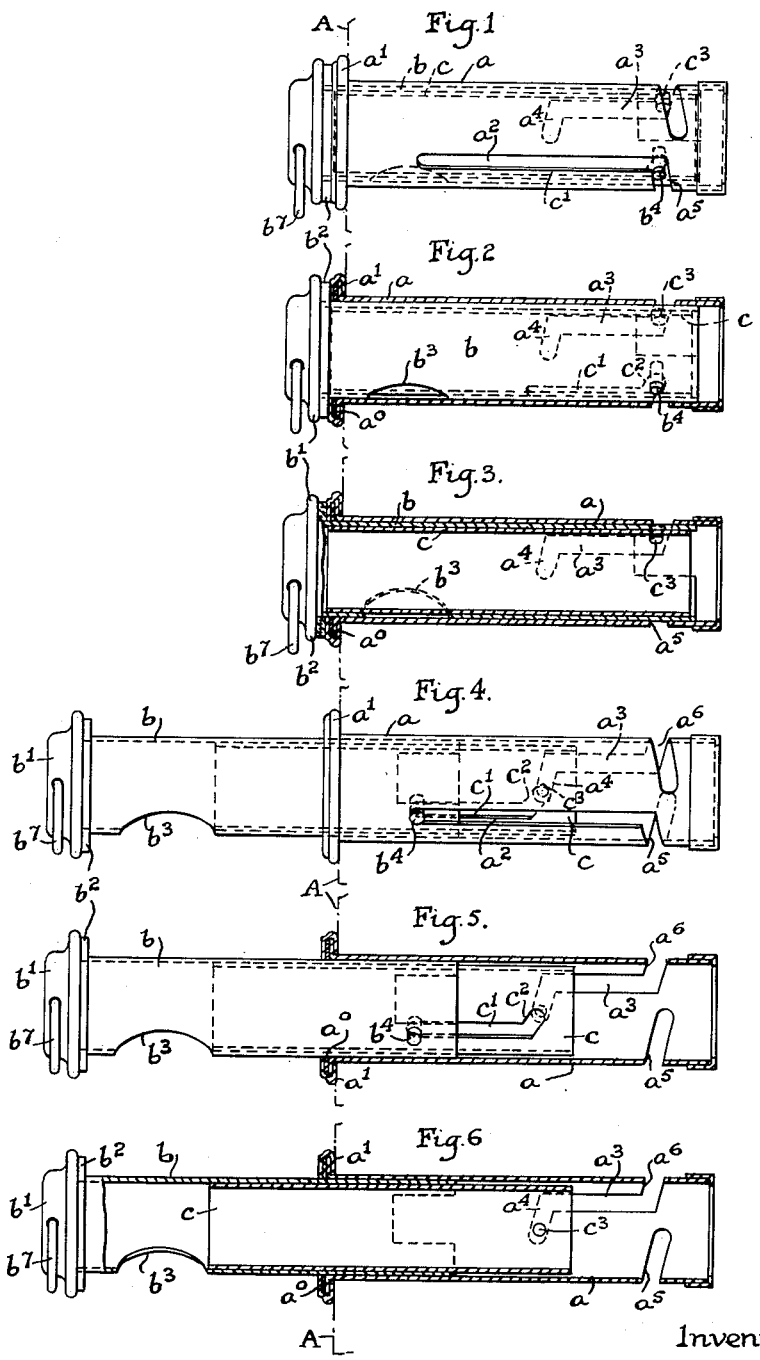

May 30, 1933. C. S. PHILLIPS 1,912,304
TAP FOR FLUIDS
Filed April 19, 1930 6 Sheets-Sheet 2
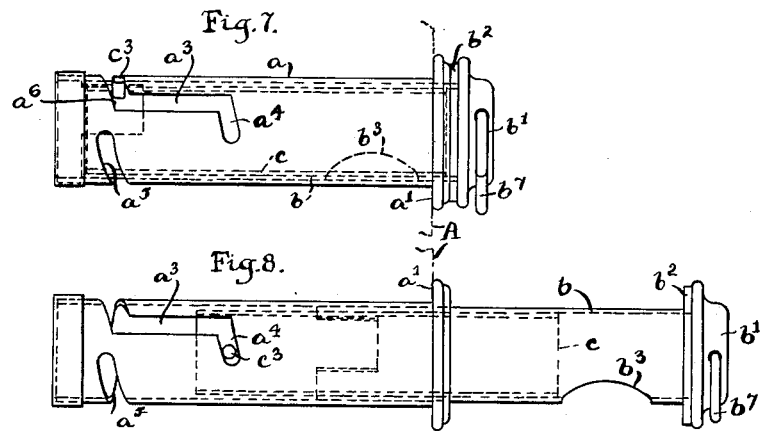
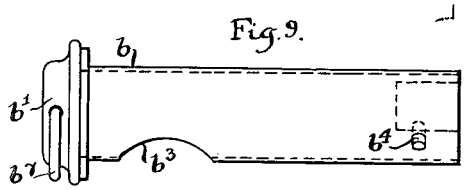
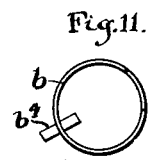
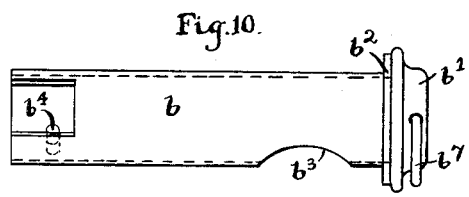
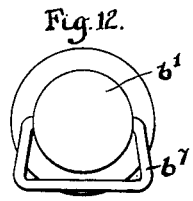
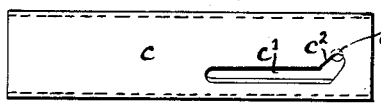
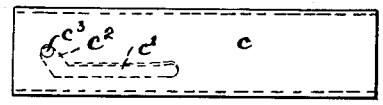
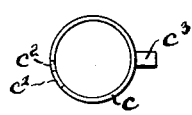
Inventor.

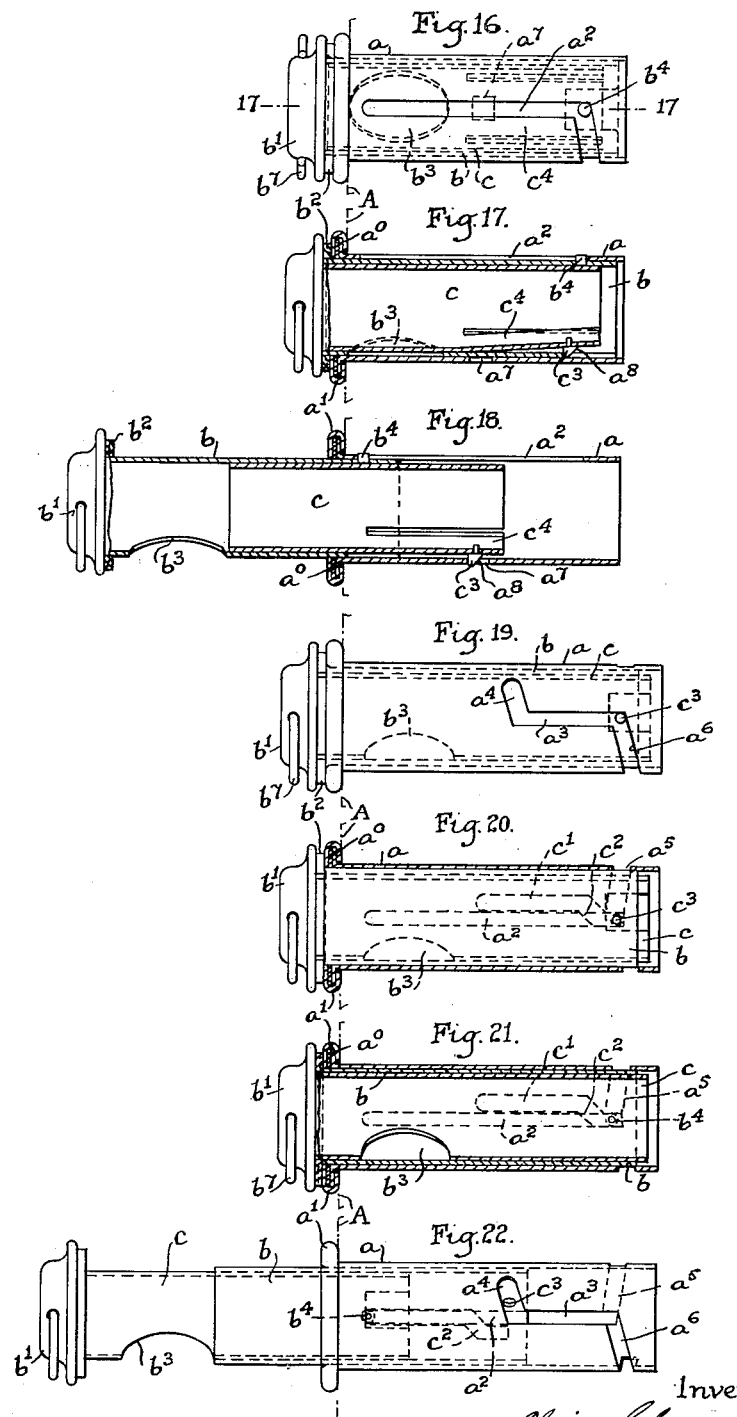

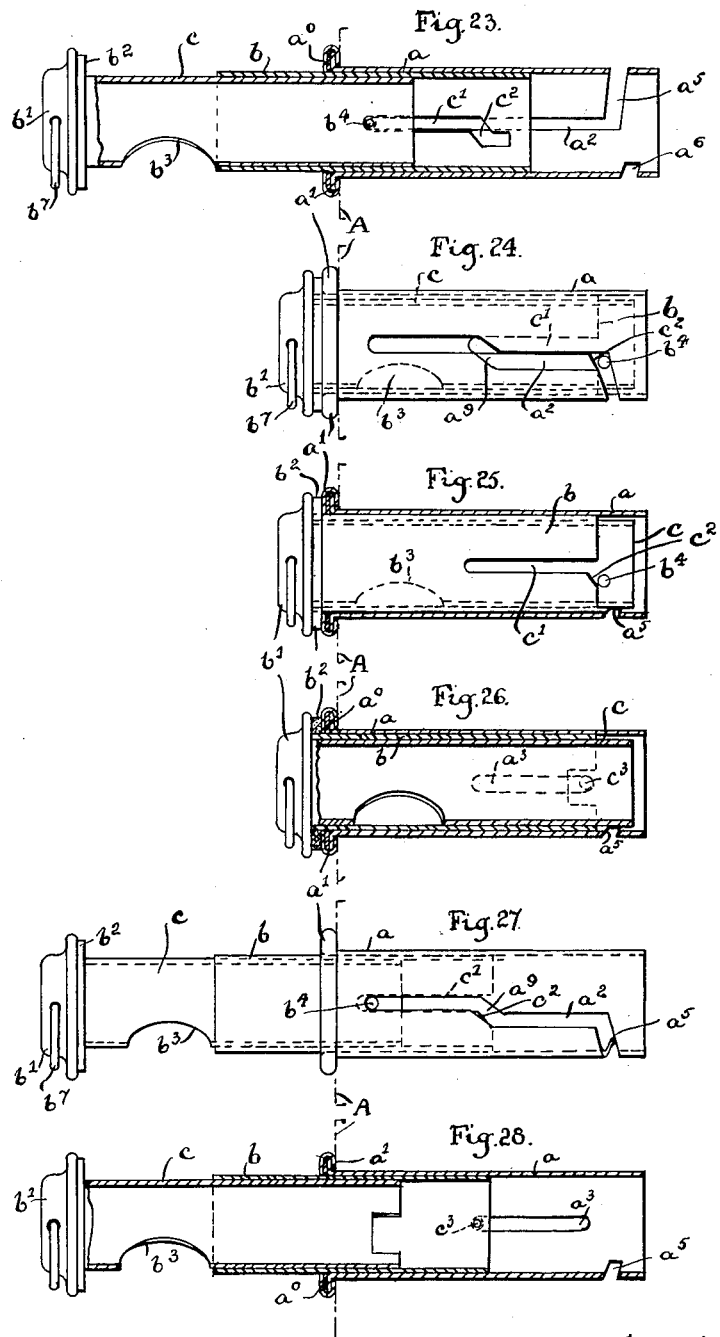

May 30, 1933. C. S. PHILLIPS 1,912,304
TAP FOR FLUIDS
Filed April 19, 1930 6 Sheets-Sheet 5
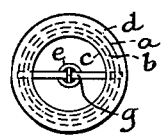
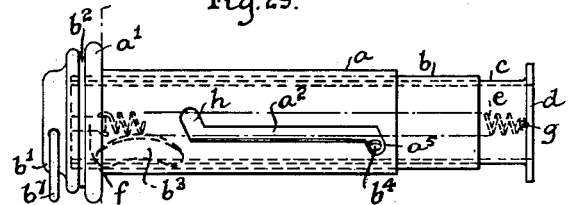
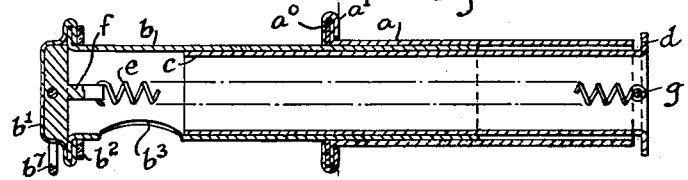
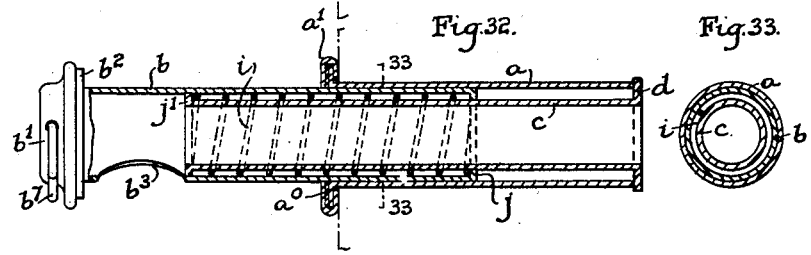
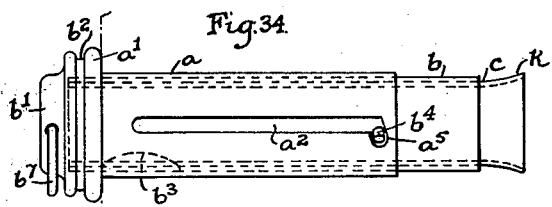
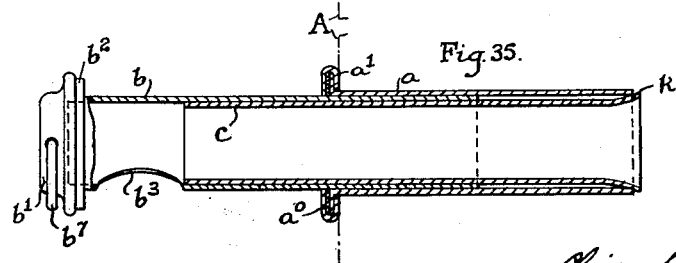
Inventor.
Clive Selwy Phillips,
By Watson, Coit, Morse & Grindle
Attys

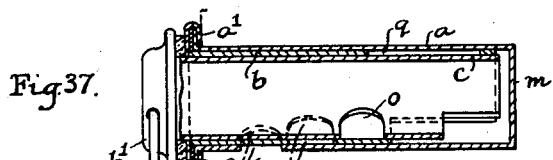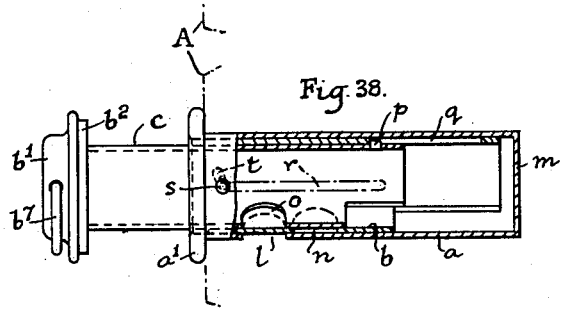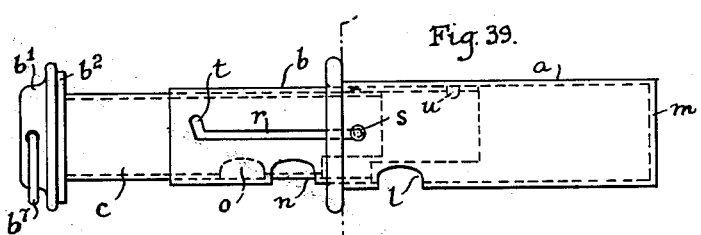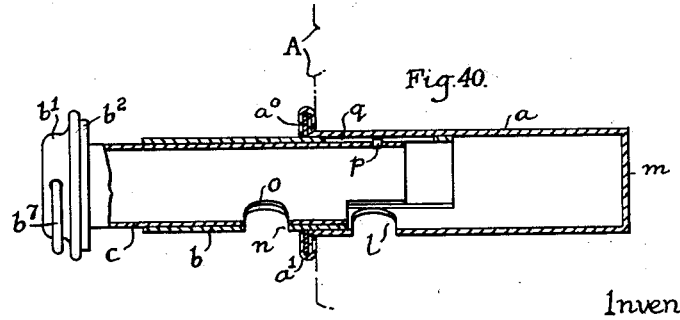

Patented May 30, 1933

1,912,304

UNITED STATES PATENT OFFICE

CLIVE SELSEY PHILLIPS, OF LONDON, ENGLAND, ASSIGNOR TO PHILLIPS TELESCOPIC TAPS LIMITED, OF LONDON, ENGLAND, A BRITISH COMPANY

TAP FOR FLUIDS

Application filed April 19, 1930, Serial No. 445,680, and in Great Britain August 16, 1929.

This invention relates to taps for fluids, more particularly designed for use as permanent fittings to drums and barrels, and so that when not in operation they project to a negligible extent (if at all) from the surfaces of the containers and are therefore free from liability to damage in transit, but when in operation they will discharge the fluids without allowing them to come into contact with the containers.

According to the invention a tap for fluids comprises at least three telescoping members one at least of which is provided with an aperture or apertures which after the said members have been relatively extended affords or may be arranged to afford a free passage for the flow of fluid through the tap.

To enable the invention to be fully understood, reference is directed to the accompanying drawings, in which:—

Figure 1 is a side view of a tap for fluids, constructed in accordance with the invention, showing the parts thereof being in the contracted position.

Figure 2 is a view similar to Figure 1, but showing the outermost tube in section.

Figure 3 is a view similar to Figure 1, but showing all the telescoping tubes in section.

Figures 4, 5 and 6 are, respectively, views similar to Figures 1, 2 and 3, but showing the parts of the tap in the extended position.

Figure 7 is a view of the side of the tap opposite to that shown in Figure 1, showing the parts thereof in the contracted position.

Figure 8 is a view similar to Figure 7 but showing the parts of the tap in the extended position.

Figures 9 and 10, are respectively, views of the opposite sides of the operating tube of the tap.

Figures 11 and 12 are views of each end of the tube shown in Figures 9 and 10.

Figures 13, 14 and 15 are, respectively, views of opposite sides and of one end of the innermost tube of the tap.

Figure 16 is a plan view of a modified form of tap constructed in accordance with this invention showing the parts thereof in the contracted position.

Figure 17 is a section on the line 17—17, Figure 16.

Figure 18 is a view similar to Figure 17 but showing the parts of the tap in the extended position.

Figure 19 is a side view illustrating another modification of a tap constructed in accordance with this invention showing the parts thereof in the contracted position.

Figure 20 is a view similar to Figure 19 but showing the outermost tube in section.

Figure 21 is a view similar to Figure 19 but showing all the telescoping tubes in section.

Figures 22 and 23 are, respectively, views similar to Figures 19 and 21 but showing the parts of the tap in the extended position.

Figures 24 to 28 are, respectively, views similar to Figures 19 to 23 but illustrating another modification of the invention.

Figure 29 is a side view of a modified form of tap constructed in accordance with this invention showing the parts thereof in the contracted position.

Figure 30 is an end view of the tap illustrated in Figure 29.

Figure 31 a longitudinal section of the tap illustrated in Figure 30 but showing the parts in the extended position.

Figure 32 is a view similar to Figure 31, but illustrating a further modification of the invention.

Figure 33 is a section on the line 33—33, Figure 32.

Figure 34 is a side view of another modified form of tap constructed in accordance with this invention showing the parts thereof in the contracted position.

Figure 35 is a sectional side view of the tap illustrated in Figure 34 but showing the parts thereof in the extended position.

Figure 36 is a side view illustrating a further modification of the invention showing the parts thereof in the contracted position.

Figure 37 is a view similar to Figure 36, but showing all the telescoping tubes in section.

Figure 38 is a view similar to Figure 37 but showing a partial extension of the inner tube.

Figure 39 is a side view of the tap illustrated in Figure 36 but showing the parts fully extended but not in the open position, and Figure 40 is a view similar to Figure 37 showing the parts of the tap in the open position.

Similar reference letters indicate similar or corresponding parts throughout the drawings.

Referring to Figures 1 to 15 of the drawings, a tube $a$ termed the outer tube, open at both ends, is arranged to be fitted within an opening in a container A and is formed with a flange $a'$ exterior to and adapted for soldering or brazing to the said container. This may also be adapted to any other known means of attachment to containers whether of metal or wood by provision of a suitable collar for screwing, nailing, clipping etc., as may be required. Within the tube $a$ is slidably fitted a second tube $b$, termed the middle tube, open at the inner end to the container A and closed at the outer end as indicated at $b'$. A third tube $c$, termed the inner tube, open at both ends, and approximately of the same length as the middle tube $b$, is slidably fitted in the latter, the aperture $b^3$ in the middle tube $b$ being covered by the inner tube $c$ when the tubes are in the contracted position indicated in Figures 1 to 3. The outer end $b'$ of the middle tube $b$ is arranged when in the contracted position (Figures 1, 2 and 3) to form a fluid-tight joint with the outer flanged end $a'$ of the outer tube $a$ through the medium of a packing washer $b^2$, and preferably a packing washer $a^0$ is arranged within the flange $a'$ to form a fluid-tight joint between the outer tube $a$ and the middle tube $b$.

When the middle tube $b$ is extended relatively to the outer tube $a$ and the inner tube $c$ as indicated in Figures 4, 5 and 6, a free passage is afforded the fluid from the container A through the tap by way of an aperture $b^3$ formed in the middle tube $b$.

The middle tube $b$ is provided at its inner end with a pin $b^4$ which projects inwardly into engagement with a guide-slot $c'$ in the inner tube $c$, the said slot being formed longitudinally of the inner tube $c$ and provided at its inner end with an inclined or cam extension $c^2$. The pin $b^4$ is also arranged to project outwardly into engagement with a guide-slot $a^2$ formed longitudinally in the outer tube $a$. The inner tube $c$ is provided with a pin $c^3$ which projects into engagement with a second guide-slot $a^3$ formed longitudinally in the outer tube $a$ and provided at its forward end with an extension $a^4$ arranged substantially at right-angles thereto.

With the described arrangement, assuming that the tubes $b$ and $c$ are in the contracted position within the outer tube $a$ with the pins $b^4$ and $c^3$ at the inner ends of the slots $a^2$ and $a^3$, respectively, and the pin $b^4$ also engaging with the cam extension $c^2$ of the slot $c'$ in the inner tube $c$, if the tube $b$ is extended, and for which purpose it is provided with a hinged manipulating bail $b^7$ or other suitable means of operation, it will carry with it the inner tube $c$ and cause the pins $b^4$ and $c^3$ to travel along the slots $a^2$ and $a^3$ respectively. When, however, the pin $c^3$ in its forward movement strikes the forward end of the slot $a^3$, further forward movement of the tube $c$ will be arrested, and the continued forward movement of the tube $b$ will cause the pin $b^4$ to travel first along the cam extension $c^2$ and thereafter along the slot $c'$, the movement of the pin $b^4$ in the said cam extension effecting a slight rotation of the tube $c$ within the tube $b$ so as to move the pin $c^3$ into the extension $a^4$ of the slot $a^2$. The described continued outward movement of the tube $b$ is arrested by the pin $b^4$ striking the forward end of the slot $a'$, the said movement uncovering the aperture $b^3$ so that fluid can flow from the container A through the tubes $a$, $b$ and $c$ and be discharged through the said aperture $b^3$. This position of the parts is illustrated in Figures 4, 5 and 6. When it is required to close the tap, the middle tube $b$ is pushed into the outer tube $a$ and as the inner tube $c$ is held against longitudinal movement by the engagement of the pin $c^3$ thereon with the angled extension $a^4$ of the slot $a^2$ in the outer tube $a$, the aperture $b^3$ will be moved so as to be closed by the said tube $c$, and when this closure is effected, the pin $b^4$ will, in its movement along the slots $a^2$ and $c'$, enter the cam extension $c^2$ of the slot $c'$ and act on this extension so as to rotate the inner tube $c$ and remove the pin $c^3$ on the inner tube $c$ from the angled extension $a^4$ of the slot $a^2$. Continued inward movement of the tube $b$ carries the tube $c$ with it and the said tube $b$ is arrested by the pin $b^4$ striking the rear end of the slot $a^2$ in which position the packing washer $b^2$ comes into contact with the flange $a'$ of the tube $a$. In order that the said packing washer $b^2$ can form a fluid-tight joint with the flange $a'$, the slot $a^2$ is formed at its rear end with a cam extension $a^5$ with which the pin $b^4$ can be caused to engage by a slight rotation of the middle tube $b$ in the outer tube $a$, the pin $b^4$ as it rides against one side of the cam extension $a^5$ drawing the packing washer $b^2$ tightly against the flange $a'$. As the tube $b$ is rotated to engage the pin $b^4$ with the cam extension $a^5$ the inner tube $c$ and the pin $c^3$ on the latter will be correspondingly moved and therefore the rear end of the slot $a^3$ is formed with an extension $a^6$ to receive the pin $c^3$. Figures 1 to 3 illustrate the position of the parts of the tap after the tube $b$ has been slightly rotated to draw the packing washer $b^2$ tightly against the flange $a'$.

From the foregoing it will be appreciated that the tube $c$ is positively held during the uncovering and covering of the aperture $b^3$.

In the tap illustrated in Figures 16 to 18, the parts operate in a manner similar to those of the tap illustrated in Figures 1 to 15, that is to say, the inner tube $c$ is positively arrested while being extended by the middle tube $b$ by a pin $c^3$ thereon engaging with a recess in the tube $a$, this recess, however, is in the form of a perforation $a^7$. The pin $c^3$ is attached to a spring strip portion $c^4$ of the inner tube $c$, and, in the closed position of the tap, the pin $c^3$ is pressed by the said spring strip against the interior surface of the tube $a$ as shown clearly in Figure 17, with the result that the side of the tube $c$ opposite to that provided with the pin $c^3$ is pressed against the inner surface of the middle tube $b$, the friction set up thereby being greater than that set up by the pressure of the pin $c^3$ against the tube $a$ so that if the middle tube $b$ be extended it will carry with it the tube $c$. The perforation $a^7$ is in such a position that when the middle tube $b$ is partially withdrawn from the tube $a$, the pin $c^3$ will snap into the perforation $a^7$ and arrest any further outward movement of the inner tube $c$, the continued outward movement of the middle tube $b$ uncovering the discharge aperture $b^3$ therein, as illustrated in Figure 18. To close the tap, the middle tube $b$ is pushed into the outer tube $a$, the inner tube $c$ being held against movement by the engagement of the pin $c^3$ with the perforation $a^7$, so that the discharge aperture $b^3$ is moved so as to be closed by the inner tube $c$. The continued inward movement of the tube $b$ brings the outer end thereof into contact with the outer end of the tube $c$ and moves the latter tube inwardly, the pin $c^3$ being forced out of the perforation $a^7$ by an inclined surface $a^8$ thereon riding over the rear edge of the perforation $a^7$ and thereby bending upwardly the spring strip portion $c^4$ of the middle tube $b$. The closed position of the tubes $b$ and $c$ is indicated in Figures 16 and 17. The outer tube $a$ in this arrangement is formed with a guide-slot $a^2$ having a cam extension $a^5$, and the middle tube $b$ is provided with a pin projection $b^4$ arranged to engage with the said slot, in the manner described with reference to Figures 1 to 15 so that the parts function in a similar manner to that described with reference to these figures, to guide the tube $b$ in its opening and closing movements and for drawing the packing washer $b^2$ tightly against the flange $a'$. From the foregoing, it will be seen that the tube $c$ is only positively held during the uncovering of the aperture $b^3$ in the middle tube $b$, it being held during the covering of the said aperture by the friction set up between the inclined surface $a^8$ and the edge of the perforation $a^7$ being greater than that set up between the tubes $b$ and $c$.

In the tap illustrated in Figures 19 to 23 the inner tube $c$ is provided with the discharge aperture $b^3$ and the middle tube $b$ comprises the tube arranged to cover and uncover the aperture $b^3$ in the inner tube $c$; otherwise the arrangement is similar to that described with reference to the tap illustrated in Figures 1 to 15. Thus the outer tube $a$ is provided with the longitudinal guide-slot $a^2$ having the extension $a^5$ in which works the pin $b^4$ on the inner tube $c$ and which pin $b^4$ also works in a longitudinal guide-slot $c'$ in the middle tube $b$ provided with the cam extension $c^2$, and the middle tube $b$ is provided with the pin $c^3$ working in a longitudinal guide-slot $a^3$ in the tube $a$, the said slot having angled extensions $a^4$ and $a^6$ at its front and rear ends, respectively.

With the described arrangement, assuming the parts of the tap to be in the position indicated in Figures 19 to 21, that is to say, with the pin $b^4$ at the rear end of the guide-slots $a^2$ and $c'$, and the pin $c^3$ at the rear end of the guide-slot $a^3$, if the inner tube $c$ is extended, it will cause the pins $b^4$ and $c^3$ to travel along the slots $a^2$ and $a^3$ respectively, the pin $c^3$ acting on one side of the slot extension $c^2$ to drive the middle tube $b$. When the pin $c^3$ strikes the forward end of the slot $a^3$, the middle tube $b$ will be arrested and the continued forward movement of the inner tube $c$ will cause the pin $b^4$, as it travels in the cam extension $c^2$, to effect a slight rotation of the middle tube $b$ so as to move the pin $c^3$ thereon into the extension $a^4$ of the slot $a^2$. The continued outward movement of the inner tube $c$ uncovers the aperture $b^3$ therein and the inner tube $c$ is then arrested by the pin $b^4$ striking the forward end of the slot $a^2$, this position of the parts being illustrated in Figures 22 and 23. To close the tap, the inner tube $c$ is pushed inwardly and relatively to the middle tube $b$ to cover the aperture $b^3$, the middle tube $b$ being held against longitudinal movement by the pin $c^3$ being in engagement with the extension $a^4$ of the slot $a^2$ of the outer tube $a$. The continued inward movement of the inner tube $c$ will then cause the pin $b^4$ to enter the cam extension $c^2$ of the slot $c'$ and act thereon to rotate the middle tube $b$ and thereby remove the pin $c^3$ thereon from the extension $a^4$ of the slot $a^2$, the further inward movement of the inner tube $c$ then moving the pin $b^4$ into contact with the rear end of the slot $c'$ so as to carry the middle tube $b$ with it until arrested by the pin $b^4$ striking the rear end of the slot $a^2$. The inner tube $c$ can then be rotated to cause the pin $b^4$ to travel in the cam extension $a^5$ of the slot $a^2$ and thereby draw the packing washer $b^2$ tightly against the flange $a'$ of the outer tube $a$.

Figures 24 to 28 illustrate another form of the tap in which the inner tube $c$ is provided with the aperture $b^3$ and the middle tube $b$ is arranged to cover and uncover this aperture. The middle tube $b$ is not, however, positively held against longitudinal movement while the inner tube $c$ is moved relatively thereto to uncover and cover the aperture $b^3$ therein as in the arrangements described with reference to Figures 1 to 15 and Figures 19 to 23, but is made a tight sliding fit within the outer tube $a$, whilst the inner tube $c$ is made a comparatively easy sliding fit within the middle tube $b$. In this arrangement, the pin $b^4$ on the inner tube $c$ works in a longitudinal guide-slot $a^2$ having about midway of its length an inclined portion $a^9$. The pin $b^4$ is also arranged to engage with a longitudinal guide-slot $c'$ in the middle tube $b$, the lower edge of the said slot terminating at the rear end in an inclined surface $c^2$ behind which the pin $b^4$ is located in the closed position of the inner tube $c$. The middle tube $b$ is provided with a pin $c^3$ engaging with a longitudinal slot $a^3$ in the outer tube $a$.

With the inner and middle tubes $c$ and $b$ in the contracted position indicated in Figures 24 to 26, if the inner tube $c$ is extended to open the tap, the pin $b^4$ will bear against the inclined surface $c^2$ and drive the middle tube $b$ forwardly until the same is arrested by the pin $c^3$ striking the forward end of the slot $a^3$ in the outer tube $a$. In this position of the middle and inner tubes $b$ and $c$, the pin $b^4$ will have entered the inclined part $a^9$ of the slot $a^2$ so that the said pin will be guided thereby out of contact with the inclined surface $c^2$ on the middle tube $b$ and travel along the remainder of the guide-slot $a^2$ to the position indicated in Figures 27 and 28, in which the aperture $b^3$ in the inner tube $c$ is exposed or open for the discharge of fluid therethrough. To close the tap, the inner tube $c$ is pressed inwardly and will travel within the middle tube $b$ which is held against movement by friction with the outer tube $a$, but when the washer $b^2$ strikes the forward end of the middle tube $b$, the pin $b^4$ will have been guided by the inclined portion $a^9$ of the slot $a^2$ into position again behind the inclined surface $c^2$ on the middle tube $b$ the continued inward movement of the inner tube $c$ bringing the middle and inner tubes $b$ and $c$ again to the position indicated in Figures 24 to 26. The packing washer $b^2$ can then be tightened against the flange $a'$ by rotating the inner tube $c$ so that the pin $b^4$ rides in a cam extension $a^5$ of the slot $a^2$ of the outer tube $a$.

The tap illustrated in Figures 29 to 31 comprises three telescoping tubes $a$, $b$ and $c$ similar to those illustrated in Figures 1 to 15, but in this case the closing of the aperture $b^3$ is effected automatically. In this arrangement the inner tube $c$ is provided at its inner end with a stop-flange $d$, designed, when the middle tube $b$ is drawn out with relation to the outer tube $a$, to come into contact with the inner end of the said outer tube $a$ so as to arrest the movement of the inner tube $c$, the continued outward movement of the middle tube $b$ opening the tap by uncovering the aperture $b^3$ in the middle tube $b$ and allowing a free passage therethrough for the fluid in the container.

The relative movement of the middle tube $b$ and inner tube $c$ necessary for covering the aperture in the middle tube $b$, when closing the tap, is effected automatically by a tension spring $e$ arranged within, and having its ends connected respectively to the middle and inner tubes $b$ and $c$ as indicated at $f$ and $g$, Figure 31, the spring $e$ being extended by the outward movement above referred to for opening the tap.

After the automatic closing of the aperture $b^3$ in the middle tube $b$ by the inner tube $c$ has been effected in the manner described, the middle tube $b$ must be pushed within the outer tube $a$ so as to bring the packing washer $b^2$ on the middle tube $b$ into contact with the flanged end $a'$ of the outer tube $a$ so as to form a fluid-tight joint therewith to avoid leakage. The middle tube $b$ is furnished with a pin $b^4$ working in a guide-slot $a^2$ formed on the outer tube $a$ and provided with a cam extension $a^5$ at its rear end, similarly to the tap illustrated in Figures 1 to 15.

The slot $a^2$ is also formed at the front end with an extension $h$ at an angle, so that by a slight rotation of the middle tube $b$ relatively to the outer tube $a$, when extended therefrom, the middle tube $b$ can be held against the action of the spring $e$ by engagement of the pin $b^4$ with the extension $h$. Alternately the pin $b^4$ may be fitted to the outer tube $a$, and the guide-slot $a^2$ formed in the middle tube $b$.

Instead of the tension spring $e$ for effecting the automatic closure of the tap, a compression spring may be employed. This arrangement is illustrated in Figures 32 and 33, a compression spring $i$ being arranged between the middle tube $b$ and the inner tube $c$ and bearing at its ends against abutment surfaces $j$, $j'$ provided, respectively, on the tubes $b$ and $c$.

Instead of the relative movement of the middle and inner tubes $b$ and $c$ necessary for covering the aperture $b^3$ in the middle tube being automatically effected as described with reference to Figures 29 to 33, it may be positively effected, but in a manner differing from the positive arrangement illustrated in Figures 1 to 15, that is to say, friction may be set up between the inner and outer tubes $c$ and $a$ to hold the former, whilst the middle tube $b$ is moved to uncover or cover the discharge aperture $b^3$ therein. This construction is illustrated in Figures 34 and 35. To obtain the necessary friction between the inner and outer tubes $c$ and $a$, the inner tube $c$ is slightly expanded or bell-mouthed at the inner end as indicated at $k$ so that it is brought into frictional engagement with the inner end of the outer tube $a$ by the outward movement of the middle tube $b$ and held against further outward movement while the middle tube $b$ is further extended to uncover the aperture $b^3$ therein. On the return movement of the middle tube $b$ to close the tap, the front end of the inner tube $c$ is struck by the front end of the middle tube $b$, whereupon the two tubes are moved together to the normal position indicated in Figure 34.

In a further modification of the tap illustrated in Figures 36 to 40, the discharge aperture is designed to be uncovered after the tubes have been extended and one of them moved in the reverse direction. For this purpose three telescoping tubes $a$ $b$ and $c$ are employed, the outer tube $a$ being formed with an aperture $l$ at its forward end and having its inner end closed as indicated at $m$ and the middle and inner tubes $b$ and $c$ are provided with apertures $n$, $o$, respectively. In this arrangement the inner tube $c$ is provided with a projecting pin $p$ in engagement with a guide-slot $q$ in the middle tube $b$ and the latter is formed with a guide-slot $r$ engaging with a pin $s$ projecting from the outer tube $a$.

In the closed position of the tubes, the aperture $l$ in the outer tube $a$ is covered by the middle tube $b$ whilst the aperture $n$ in the middle tube $b$ is covered by the inner tube $c$. The inner end of the middle tube $b$ fits tightly within the outer tube $a$ whilst the whole of the inner tube $c$ fits easily within the middle tube $b$.

To open the tap, the inner tube $c$ is extended from the closed position indicated in Figures 36 and 37, to that indicated in Figure 38, the aperture $o$ therein moving past the aperture $n$ in the middle tube $b$ which is held by friction with the outer tube $a$. The middle tube $b$ is then extended by a further extended movement of the inner tube $c$ owing to the pin $p$ coming into contact with the forward end of the slot $q$, and uncovers the aperture $l$ in the outer tube $a$, the outward movement of the inner tube $c$ being determined by the pin $s$ contacting with the inner end of the slot $r$. This position of the parts is indicated in Figure 39. To open the tap, the inner tube $c$ is then moved into the middle tube $b$, which is held against movement thereby by friction with the outer tube $a$, so as to bring its aperture $o$ into register with the aperture $n$ in the middle tube $b$ whereby a passage is afforded through all the apertures $l$, $o$, $n$ for the flow of the fluid from the container A, this position of the parts being indicated in Figure 40. Further inward movement of the inner tube $c$ will first move the aperture $o$ therein out of register with the aperture $n$ in the middle tube $b$ and then bring the pin $p$ into contact with the rear end of the slot $q$ in the middle tube $b$ and cause the latter to move back to the position indicated in Figures 36 and 37.

The slot $r$ is formed with a cam extension $t$ at its forward end so that when the middle and inner tubes $b$ and $c$ are in the closed position with the pin $s$ in contact with the forward end of the slot $r$ a slight rotation of the middle tube $b$ will engage the cam extension with the pin $s$ and thereby draw the packing washer $b^2$ into close contact with the flanged end $a'$ of the outer tube $a$. This rotation of the middle tube $b$ is effected by a slight rotation of the inner tube $c$ through the medium of the pin $p$ which is thereby caused to engage with a right-angled extension $u$ of the slot $q$ in the middle tube $b$.

When the improved taps are used for delivering fluids of high viscosity it is to be understood that one or more of the tubes thereof may be provided with ports which are uncovered in the extended position of the tubes so as to provide as free a flow as possible for the fluids and when the taps are used for delivering fluids of low viscosity the aperture $b^3$ when formed in the inner tube $c$ may be extended inwardly by a short length of tube which will direct the fluid in a substantially straight stream and thus prevent splashing.

It is also to be understood that the flange $a'$ of the outer tube $a$ may be formed with a forwardly projecting rim or flange for attachment to the container A, this rim being of such a depth as to provide a recess to receive the end $b'$ of the tube which contains the aperture $b^3$ so that the outer surface of the said end is substantially flush with the outer surface of the container when the tap is closed.

I claim:

1. A tap for fluids comprising three telescopic tubes, the outermost of which is normally fixed whilst the other two are extensible or collapsible relatively to one another and relatively to the fixed tube, an aperture in the middle tube arranged to constitute the outlet of the tap and which is normally closed by the inner tube when the tubes are in the unextended position, operative connecting means between said tubes whereby as the tubes are extended the inner tube is moved relative to the middle tube to uncover said aperture only after the same is located beyond that end of the outer tube from which the middle and inner tubes are withdrawn and whereby as the tubes are collapsed, the inner tube is maintained stationary until the said aperture in the middle tube has been closed thereby.

2. A tap for fluids comprising three telescopic tubes, the outermost of which is normally fixed whilst the other two are extensible or collapsible relatively to one another and relatively to the fixed tube, an aperature in the inner tube arranged to constitute the outlet of the tap and which is normally closed by the middle tube when the tubes are in the unextended position, operative connecting means between said tubes whereby as the tubes are extended the middle tube is moved relatively to the inner tube to uncover said aperture only after said aperture is located beyond that end of the outer tube from which the middle and inner tubes are withdrawn and whereby as the tubes are collapsed, the middle tube is maintained stationary until the said aperture in the inner tube has been closed thereby.

3. A tap for fluids comprising three telescopic tubes, the outermost of which is normally fixed whilst the other two are extensible or collapsible relatively to one another and relatively to the fixed tube, an aperture in the middle tube arranged to constitute the outlet of the tap and which is normally closed by the inner tube when the tubes are in the unextended position, pin and guide slot mechanism constituting operative connecting means between said tubes whereby as the tubes are extended the inner tube is moved relatively to the middle tube to uncover said aperture only after said aperture is located beyond the end of the outer tube from which the middle and inner tubes are withdrawn and whereby as the tubes are collapsed, the inner tube is maintained stationary until the said aperture in the middle tube has been closed thereby.

4. A tap for fluids comprising three telescopic tubes, the outermost of which is normally fixed whilst the other two are extensible or collapsible relatively to one another and relatively to the fixed tube, an aperture in the inner tube arranged to constitute the outlet of the tap and which is normally closed by the middle tube when the tubes are in the unextended position, pin and guide slot mechanism constituting operative connecting means between said tubes whereby as the tubes are extended the middle tube is moved relatively to the inner tube to uncover said aperture only after said aperture is located beyond the end of the outer tubes from which the middle and inner tubes are withdrawn and whereby as the tubes are collapsed, the middle tube is maintained stationary until the said aperture in the inner tube has been closed thereby.

5. A tap for fluids comprising three telescopic tubes, the outermost of which is normally fixed whilst the other two are extensible or collapsible relatively to one another and relatively to the fixed tube, an aperture in the middle tube arranged to constitute the outlet of the tap and which is normally closed by the inner tube when the tubes are in the unextended position, a radially disposed pin provided on the middle tube extending into a guide slot formed in the outer tube and into an inclined portion of a guide slot formed in the inner tube, a radially disposed pin on the inner tube extending into a guide slot formed in the outer tube whereby as the middle tube is withdrawn from the outer tube the pin on the middle tube engages the said inclined portion of the slot in the inner tube and moves the inner tube therewith until the aperture in the middle tube is located wholly beyond the outer tube and the pin on the inner tube is thereupon arrested by an inclined portion of the slot therefor in the outer tube which is operable to effect rotation of the inner tube to move the pin on the middle tube out of the inclined portion of the slot in the inner tube and further outward movement of the middle tube moves the outlet aperture therein clear of the inner tube.

6. A tap for fluids comprising three telescopic tubes, the outermost of which is normally fixed whilst the other two are extensible or collapsible relatively to one another and relatively to the fixed tube, an aperture in the middle tube arranged to constitute the outlet of the tap and which is normally closed by the inner tube when the tubes are in the unextended position, a radially disposed pin provided on the middle tube extending into a guide slot formed in the outer tube and into an inclined portion of a guide slot formed in the inner tube, a radially disposed pin on the inner tube extending into a guide slot formed in the outer tube whereby as the middle tube is withdrawn from the outer tube the pin on the middle tube engages the said inclined portion of the slot in the inner tube and moves the inner tube therewith until the aperture in the middle tube is located wholly beyond the outer tube and the pin on the inner tube is thereupon arrested by an inclined portion of the slot therefor in the outer tube which is operable to effect rotation of the inner tube to move the pin on the middle tube out of the inclined portion of the slot in the inner tube and further outward movement of the middle tube moves the outlet aperture therein clear of the inner tube and whereby inward movement of the middle tube from the fully extended position moves the outlet aperture therein over the inner tube and closes said aperture and the pin on the middle tube thereafter engages said inclined portion of the slot in the inner tube and rotates the same until the pin on the inner tube is withdrawn from the inclined portion of the slot therefor in the outer tube and the middle and inner tubes are operable thereafter to be moved together within the outer tube.

7. A tap for fluids comprising three telescopic tubes, the outermost of which is normally fixed whilst the other two are extensible or collapsible relatively to one another and relatively to the fixed tube, an aperture in the inner tube arranged to constitute the outlet of the tap and is normally closed by the middle tube when the tubes are in the unextended position, a radially disposed pin provided on the middle tube extending into a guide slot formed in the outer tube, a radially disposed pin provided upon the inner tube extending through a guide slot formed in the middle tube and normally abutting against an inclined portion thereof and extending into a guide slot formed in the outer tube, said pins and slots being operable to control the relative movements of the three tubes whereby when the inner tube is withdrawn, both said pins travel down the guide slots therefor in the outer tube and the pin on the inner tube moves the middle tube by engagement with the said inclined portion of the slot in the middle tube until the aperture in the inner tube is located wholly beyond the outer tube and the pin on the middle tube abuts against an inclined portion of the slot therefor in the outer tube which operates to effect rotation of the middle tube to move the inclined portion of the slot therein clear of the pin on the inner tube and to arrest further outward movement of the middle tube so that further outward movement of the middle tube moves the outlet aperture therewith clear of the middle tube.

8. A tap for fluids comprising three telescopic tubes, the outermost of which is normally fixed whilst the other two are extensible or collapsible relatively to one another and relatively to the fixed tube, an aperture in the inner tube arranged to constitute the outlet of the tap and is normally closed by the middle tube when the tubes are in the unextended position, a radially disposed pin provided on the middle tube extending into a guide slot formed in the outer tube, a second radially disposed pin provided upon the inner tube extending through a guide slot formed in the middle tube and normally abutting against an inclined portion thereof and extending into a guide slot formed in the outer tube, said pins and slots being operable to control the relative movements of the three tubes whereby when the inner tube is withdrawn both said pins travel down the guide slots therefor in the outer tube and the pin on the inner tube moves the middle tube by engagement with the said inclined portion of the slot in the middle tube until the aperture in the inner tube is located wholly beyond the outer tube and the pin on the middle tube abuts against an inclined portion of the slot therefor in the outer tube which operates to effect rotation of the middle tube to move the inclined portion of the slot therein clear of the pin on the inner tube and to arrest further outward movement of the middle tube so that further outward movement of the middle tube moves the outlet aperture therein clear of the middle tube and whereby inward movement of the inner tube from the fully extended position moves the outlet aperture therein within the middle tube whereafter the pin on the inner tube engages the inclined portion of the slot therefor in the middle tube and rotates the said tube to move the pin thereon out of the inclined portion of the slot therefor in the outer tube and the inner and middle tubes are operable thereafter to be moved within the outer tube.

9. A tap for fluids comprising three telescopic tubes, the outermost of which is normally fixed whilst the other two are extensible or collapsible relatively to one another and relatively to the fixed tube, an aperture in one of the two inner tubes arranged to constitute the outlet for the tap and in respect of which the second of the inner tubes constitutes a closure member, an operative connection between the two inner tubes whereby the same are normally operable to be moved longitudinally together, means operable to arrest outward movement of the closure tube when the two inner tubes have been withdrawn together from the outer tube and the said outlet aperture is located wholly beyond the outer tube whereby the said apertured tube may be moved relatively to the closure tube to uncover the said aperture and open the tap, and means for restraining the movements of the closure tube upon inward movement of the apertured tube until said aperture is closed by the closure tube.

10. A tap for fluids comprising three telescopic tubes, the outermost of which is normally fixed whilst the other two are extensible or collapsible relatively to one another and relatively to the fixed tube, an aperture in the middle tube arranged to constitute the outlet for the tap and which in he unextended position of the tubes is closed by the inner tube, said middle and inner tubes being operatively connected for movement together by friction between the two tubes, a yielding member provided on the inner tube and carrying a rearwardly inclined stop normally arranged to bear against the inner wall of the outer tube and to engage with a rearwardly directed abutment on the middle tube, an aperture in the outer tube arranged in a partially extended position of the tubes to receive said stop whereby withdrawal of the middle tube from the outer tube carries the inner tube therewith until the stop on the inner tube is moved by the yielding member into the aperture in the outer tube to arrest further outward movement of the inner tube, and the outlet aperture in the middle tube is opened only after the same is located beyond the outer tube and whereby, as the middle tube is moved inwardly from the fully extended position, the inner tube is maintained against movement by the stop thereon extending into the aperture in the outer tube until the outlet aperture in the middle tube is covered by the inner tube and the abutment on the middle tube engages the stop on the inner tube and moves the same so that the said stop is deflected by engagement of the inclined surface thereof with the edge of the aperture in the outer tube and the middle and inner tubes may threafter be moved together within the outer tube.

11. A tap for fluids comprising at least three telescopic members, one of which is normally fixed whilst the other two are extensible or collapsible relatively to one another and relatively to the fixed member, and one of which is provided with an aperture arranged to constitute the outlet of the tap and which is closed by at least one of the other of said members when the same are in the unextended position, manipulating means on one of the extensible members and operative connecting means between said members whereby the tap is operable to be opened or closed by simple movement of said manipulative means respectively in the direction of extension or collapse of said members and in opening the tap said aperture is maintained closed as the members are extended until the whole of said aperture is located beyond the said fixed member and in closing the tap said aperture is closed before the same reaches said fixed member.

12. A tap for fluids comprising at least three telescopic members, one of which is normally fixed whilst the other two are extensible or collapsible relatively to one another and relatively to the fixed member, and one of which is provided with an aperture arranged to constitute the outlet of the tap, said aperture being normally closed by at least one other of said members, manipulative means on one of said extensible members, and operative connecting means between the said members operable by simple movement of said manipulative means in the direction respectively of extension or collapse of said members to effect relative movement between the apertured member and the closure member to uncover said aperture only when the same is located beyond the said fixed member or to close said aperture before the same reaches the fixed member.

13. A tap for fluids comprising at least three telescopic members, one of which is normally fixed whilst the other two are extensible or collapsible relatively to one another and relatively to the fixed member, and one of which is provided with an aperture arranged to constitute the outlet of the tap and which is closed by at least one of the other of said members when the same are in the unextended position, manipulative means on one of said extensible members, and pin and guide slot mechanism constituting operative connecting means between said members whereby simple movement of said manipulative means in the direction respectively of extension or collapse of said members opens or closes the tap and maintains said outlet aperture closed as the members are extended until the whole of said aperture is located beyond the said fixed member or closes said aperture before it reaches the fixed member.

14. A tap for fluids comprising at least three telescopic members, one of which is normally fixed whilst the other two are extensible or collapsible relatively to one another and relatively to the fixed member, and one of which is provided with an aperture arranged to constitute the outlet of the tap, said aperture being normally closed by at least one other of said members, manipulative means on one of said extensible members, and pin and guide slot mechanism constituting operative connecting means between the said members operable upon simple movement of said manipulative means in the direction respectively of extension or collapse of said members to effect relative movement between the apertured member and the closure member to uncover said aperture only when the same is located beyond the said fixed member or to close said aperture before it reaches the fixed member.

15. A tap for fluids comprising at least three telescopic members, one of which is normally fixed whilst the other two are extensible relatively to one another and relatively to the fixed member, and one of which is provided with an aperture arranged to constitute the outlet of the tap and which is closed by at least one of the other of said members when the same are in the unextended position, a yielding control operatively connecting said extensible members to one another with the outlet aperture normally maintained closed, means operable to limit the movement of one of said extensible members as the said members are extended so that further movement of the other extensible member against the influence of the yielding control uncovers the outlet aperture only when the whole of said aperture is located beyond the said fixed member, and means operable to lock the extensible members in the extended position against the influence of the yielding control.

16. A tap for fluids comprising at least three telescopic members, one of which is normally fixed whilst the other two are extensible relatively to one another and relatively of the fixed member, and one of which is provided with an aperture arranged to constitute the outlet of the tap and which is closed by at least one of the other of said members when the same are in the unextended position, manipulative means on one of said extensible members and a yielding control operatively connected between the said members, pin and guide slot mechanism constituting operative connection means between said members whereby upon simple movement of said manipulative means in the direction of extension of said members said outlet aperture is maintained closed as the members are extended against said yielding control until the whole of said aperture is located beyond the said fixed member, and means operable to lock the extensible members in the extended position against the influence of the yielding control.

CLIVE SELSEY PHILLIPS.